United States Patent [19]

Mizuno et al.

[11] Patent Number: 5,676,786
[45] Date of Patent: Oct. 14, 1997

[54] RESIN MOLDING AND PRODUCTION METHOD FOR SAME

[75] Inventors: Kosuke Mizuno, Kasugai; Itsuki Sakai, Mino; Kenzo Tanaka, Akashi; Koji Hayashi, Komaki, all of Japan

[73] Assignee: Mitsuboshi Belting Ltd., Hyogo, Japan

[21] Appl. No.: 549,029

[22] Filed: Oct. 27, 1995

[30] Foreign Application Priority Data

Jan. 27, 1995 [JP] Japan .................. 7-031458

[51] Int. Cl.⁶ .................................................. B29C 47/00
[52] U.S. Cl. .................. 156/245; 156/78; 156/242; 156/285
[58] Field of Search .................. 428/319.3, 319.7, 428/319.9; 156/77, 78, 242, 245, 285

[56] References Cited

U.S. PATENT DOCUMENTS

| | | | |
|---|---|---|---|
| 5,354,397 | 10/1994 | Miyake et al. | 156/77 |
| 5,532,055 | 7/1996 | Igarashi et al. | 428/318.6 |

*Primary Examiner*—Christopher Raimund
*Attorney, Agent, or Firm*—Wood, Phillips, VanSanten, Clark & Mortimer

[57] ABSTRACT

A resin molding and a method for producing the molding in which a skin material having a first solid surface layer produced by slush-molding a pulverized mixture of a polypropylene resin and a styrene series thermoplastic elastomer which are then laminated onto a surface of a resinous core by integral molding. The skin material also has at least two additional layers, i.e., a foamed middle layer and a solid inner layer.

20 Claims, 2 Drawing Sheets

RESIN MOLDING AND PRODUCTION METHOD FOR SAME

FIELD OF THE INVENTION

The present invention relates to a resin molding such as instrument panels, door trims, and console boxes, and a production method for the same, and more specifically to a resin molding prepared by adhering a skin material on a resinous core to integrally mold them.

BACKGROUND OF THE INVENTION

Producing resin moldings such as instrumental panels, door trims, and console boxes has been accomplished by a method in which the blended resin of a vinyl chloride resin and an ABS resin is extruded in a sheet form, after which the extruded sheet is patterned with etching drawing rolls. A skin material is prepared by applying a form to this patterned extruded sheet using vacuum molding. A core material (base material) is placed in a second form by injection molding or stamp molding. The skin material and the core material are then put into a urethane foaming mold, after which urethane foam is injected into the mold to carry out integral molding.

This method is problematic for several reasons. First, etching drawing prevents a sufficient leather-like drawn effect from appearing on the finished product. Second, on a design, stretching a sheet by vacuum molding expands the drawing, making it shallow. Third, recycling is made more difficult because the three-layer structure described above cannot readily be separated, and the cost for processing the waste thereof increases as well. Additionally, since the preceding process involves the three steps of skin material molding, core material molding and foaming molding, the cost of producing a product is simply too high, particularly one with a soft texture and feel.

Accordingly, alternatives such as an injection-press method or a method called SP molding (Low-Strain Molding Process) are employed for producing moldings having less distortion and less deformation caused by production processes using low pressure, such as a post-urethane process. In these methods, a composite sheet with an EPP backing sheet is prepared by calendaring or extrusion molding together with a form employing vacuum molding. The composite sheet is set in a female mold for injection molding to integrally mold a skin material and a core material.

On the other hand, slush skin molding using an electroformed mold has so far been available as a regenerating method for a genuine leather-like drawn feel. Vinyl chloride-made skin, vinyl chloride-made foamed product, and integral foamed articles with a core, which are produced using the slush skin molding method, are products which have an excellent drawn feel.

Additionally, a post-urethane process providing a genuine leather-like drawn feel has also been used. This process includes a method in which a shell is formed with an electroformed mold. A female mold of an injection-molding mold backed with ZAS casting is then produced. An integral molding process is carried out with a mixture of a polypropylene resin and ethylene-propylene rubber containing a process oil. An olefin series thermoplastic elastomer (TPO) is used to produce the female mold face, while a polypropylene resin is used to produce a male mold face by double injection.

However, the defect of the SP molding is that, since a skin material is processed in advance to the sheet, scraps of the skin material are generated in a proportion of 50 to 60% of that found in integral molding. As a result, a genuine leather-like drawn feel is not obtained. Because of the resulting compromise on texture, the cost reduction effect of SP molding is considered negligible when taking into account the additional steps required to achieve the desired product.

Furthermore, a vinyl chloride-made skin, a vinyl chloride-made foamed product and an integrally foamed article with a core, which are obtained by slush molding, have as few as 30–40% skin scraps, but are very costly because of the urethane foaming process.

In the double injection process, since an electroformed mold is deformed by shrinkage and distortion at the cooling stage in ZAS casting production for creating the mold, large-sized products such as instrument panels cannot be produced. Also, TPO has a bad flow property, it slides, and it requires a large plate thickness of 1.5 to 2.5 mm, which makes the product heavier. Furthermore, TPO requires aftercoating to prevent uneven gloss and scratches.

The object of the present invention is to provide a resin molding which is prepared through integral molding by combining a skin material obtained by slush molding with low pressure injection molding to adhere the skin material firmly to a core material so as to provide a soft feel, and a production method for the same.

SUMMARY OF THE INVENTION

The present invention is directed to a resin molding prepared by laminating a skin material obtained by slush-molding the pulverized product of a thermoplastic elastomer on the surface of a resinous core by integral molding.

The thermoplastic elastomer may be selected from a styrene series thermoplastic elastomer, an olefin series thermoplastic elastomer, a urethane series thermoplastic elastomer, and/or a polyester series thermoplastic elastomer. The styrene series thermoplastic elastomer will contain a polypropylene resin, and is obtained by mixing the polypropylene resin with the styrene series thermoplastic elastomer in a weight ratio of between 30/70 and 70/30, while the skin material is made up of three layers of a solid surface layer, a foamed layer and a solid inner layer.

The present invention includes a production method for a resin molding, including the steps of adhering a skin material to one mold and supplying a molten resin between a female mold and a male mold which are initially separated. The female mold and the male mold are then compressed together so as to introduce the molten resin into a cavity. Pressure is applied to give shape to the molten resin to thereby carry out integral molding with the skin material adhered to a resinous core, wherein the product obtained by slush-molding a pulverized thermoplastic elastomer is used as the skin material. The core is a resin selected from polypropylene, ABS, and/or polystyrene.

The present invention also includes a multi-layered skin material containing an elastomer selected from a styrene series thermoplastic elastomer, an olefin series thermoplastic elastomer, a urethane series thermoplastic elastomer, and/or a polyester series thermoplastic elastomer. By way of example, but not limitation, the skin material may be made of three layers of a solid surface layer obtained by slush-molding a pulverized mixture of a polypropylene resin and a styrene series thermoplastic elastomer in a weight ratio of from 30/70 to 70/30, a foamed layer obtained by slush-molding a substance prepared by adding a foaming agent to said pulverized mixture, and/or a solid inner layer obtained by slush-molding the same material as that of the surface layer.

DETAILED DESCRIPTION OF THE DRAWINGS

Although this invention is susceptible to embodiments in many different forms, preferred embodiments of the invention are shown. It should be understood, however, that the present disclosure is to be considered as an exemplification of the principles of this invention and is not intended to limit the invention to the embodiments illustrated.

The production method of a resin molding of the present invention is as follows.

Figure 1:
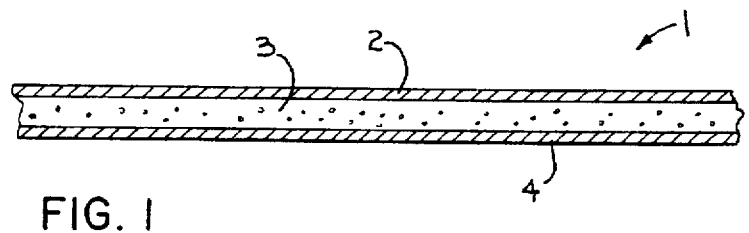
FIG. 1 illustrates a cross-sectional drawing of the skin material obtained by slush-molding used in the present invention.

As shown in FIG. 1, a skin material is obtained by slush molding and has (a) a solid surface layer 2 having a thickness of 0.2 to 1 mm and having leather crimps and stitches, (b) a foamed layer 3 having a thickness of from 1.0 to 2.0 mm and providing a cushion property, and (c) an inner layer 4 having a thickness of from 0.6 to 2.2. mm. The inner layer 4 protects the foamed layer 3 from heat and pressure while giving shape to a core material and securely adhering itself to the core material. The inner layer 4 is set to such a thickness that the foamed layer 3 of an intermediate layer will not be broken if the inner layer 4 contacts a fused resin and melts in the molding process, while maintaining an adhesion to the core material.

The solid surface layer 2 is obtained by slush-molding a pulverized material made from a thermoplastic elastomer. The foamed layer 3 is obtained by slush-molding a mixture prepared by adding a chemical foaming agent that is azodicarbonamide, dinitrosopentamethylenetetramine, and 4,4'-oxybisbenzenesulfonylhydrazine, and/or hollow beads such as microballons to the pulverized material described above. The solid inner layer 4 is obtained by slush-molding the same material as that of the surface layer 2. It is not required that the skin material 1 used in the present invention have these three layers. It may have only two layers, such as the solid surface layer 2 and the foamed layer 3, or the solid layer 2 as a single layer.

The skin material 1 is produced as follows. First, a metal mold for slush-molding, which is pre-heated in a range from 50° to 70° C., is then heated up to about 220° to 270° C. The pulverized substance is put into this metal mold, and the mold is reversed after a fixed time has passed to discharge the remaining powder resin composition into a recovery box, whereby the first layer adhered on the mold surface is formed. After the pulverized substance containing a foaming agent is put into the metal mold and discharged to form the second layer, it is cured. Subsequently, after the above pulverized substance is put into the metal mold and discharged to form the third layer, it is again cured. The metal mold is then cooled back down to about 50° to 70° C. to take the skin material out of the mold.

The thermoplastic elastomer used for the skin material, described above, includes a styrene series thermoplastic elastomer, an olefin series thermoplastic elastomer, a urethane series thermoplastic elastomer, and/or a polyester series thermoplastic elastomer. The styrene series thermoplastic elastomer may be as is or may contain a polypropylene resin which improves slush-moldability.

In this embodiment, the polypropylene resin and the styrene series thermoplastic elastomer are mixed in a weight ratio of between 30/70 and 70/30. The polypropylene resin may be either a polypropylene homopolymer or a random copolymer with an olefin. In particular, a block or random copolymer using ethylene as the a-olefin is preferred in terms of the flexibility of the molding. If powder slush-molding is used in which no pressure is applied, MFR (melt flow rate) as a standard for a melt flow property of a polypropylene resin has to be 20 g/10 minutes or more, wherein MRF is measured at 230° C. and a load of 2.16 kgf according to JIS K7210.

The styrene series thermoplastic elastomer is selected from a styrene•ethylene-butylene•styrene block copolymer (SEBS), a styrene•ethylene-propylene•styrene block copolymer (SEPS), and a hydrogenated styrene-butadiene rubber (hydrogenated SBR) having a styrene content of 20 weight percent or less. SEBS is obtained by hydrogenating a styrene•butadiene•styrene block copolymer (SBS), and includes the Crayton G series of products manufactured by Shell Chemical Co., Ltd. and the Toughtech H series of products manufactured by Asahi Chemicals Ind. Co., Ltd. In the SEBS described, as the styrene content increases, the strength goes up but the flexibility is lowered. Further, SEBS melts in slush-molding, such that styrene-hard segments are coagulated, and therefore a flat sheet-shaped molding is sometimes hard to obtain. Accordingly, the styrene content is preferably 20 weight percent or less.

SEPS is obtained by hydrogenating a styrene•isoprene•styrene block copolymer (SIS), and is available from Kuraray Co., Ltd. under the trademark SEPTON. As with SEBS, the flexibility of SEPS is lowered as the styrene content increases, and therefore the styrene content is preferably twenty weight percent or less.

Hydrogenated SBR differs from SEBS, a block copolymer, in that SBR is a styrene-butadiene rubber in which styrene and butadiene are copolymerized at random and then subsequently hydrogenated. The representative SBR product is the Dynaron series manufactured by Japan Synthetic Rubber Co., Ltd.

The larger the MFR's of these styrene series elastomers are, the more preferable they are. The mixing ratio by weight of the polypropylene resin to the styrene series thermoplastic elastomer (the polypropylene resin/the styrene series thermoplastic elastomer) is between 30/70 and 70/30. A weight ratio exceeding 70/30 lowers the flexibility, while a weight ratio of less than 30/70 reduces the heat resistance and the chemical resistance of the molding. The melt flow property of a mixed system of the polypropylene resin/styrene series thermoplastic elastomer is required to be at least 8 g/10 minutes or more in terms of MFR (230, 2.16 kgf). If it is less than this value, a lot of pinholes remain between the powders in any resulting sheet-shaped molding. In an extreme case, a lesser MFR makes fusion between powders insufficient and no sheet will be formed.

The olefin series thermoplastic elastomer (TPO) is a mixture of a polypropylene resin and an ethylene propylene rubber containing a process oil. The urethane series thermoplastic elastomer (TPU) has a urethane bond portion which is set as a hard segment, and a polyether or polyester which is set as a soft segment. The polyester series thermoplastic elastomer (TPAE) employs a polybutylene terephthalate (PBT) series polyester as a hard segment and an aliphatic polyether such as polytetramethylene glycol as a soft segment.

Substances usually used for polyolefins can be used as heat stabilizers for the mixture with the thermoplastic elastomer described above. In general, hindered phenols and organic sulfur series anti-oxidation agents may be used in combination as heat stabilizers. Benzothiazole series products are also used as light stabilizers in some cases. Organic and inorganic pigments suited for an ordinary olefin series are used as a pigment. Additionally, lubricants such as fatty acid metal salts and fillers such as calcium carbonate and talc are added as needed.

The above identified compounds are mixed in a V-type blender, a tumbler, a Henshell mixer and/or the like. The resulting mixture is then heated and kneaded with a biaxial extruder to pelletize it. This resulting pellet is pulverized with an impact-type pulverizer such as a turbo mill, a bin mill and/or hammer mill. Usually, the pellet is frozen with liquid nitrogen and pulverized. Pulverizing at room temperature provides only a coarse powder which is sticky. However, pellets containing less polypropylene resin can be pulverized at room temperature in some cases. Grains having a grain size of 500 mm or less, and preferably 300 mm or less, are sorted from pulverized substances through a sieve, and grains having a grain size exceeding 500 mm are pulverized again.

If a powder resin composition thus obtained and used for slush molding does not have a sufficient powder flow property, it will not flow into areas of complex shapes, and sheets having defects and pinholes may be formed. Accordingly, in the present invention, fluidity enhancing fillers such as calcium carbonate and silica, lubricants such as fatty acid metal salts including zinc stearate and calcium stearate, fatty amide, fatty ester, and resin fine powders may be added, particularly to the powder resin composition. The fillers described above remain as they are without melting in slush molding, but the lubricants and the resin fine powders are molten and introduced into the powder resin composition. These fluidity enhancers are added after pulverizing the pellets with a mixer such as the Henshell mixer, or before pulverizing, they may be coated on the pellets.

The additives are adhered to the surface of the powder resin composition to act as rollers, and therefore they have the effect of improving the fluidity of powders. However, since the addition of the additives described above in a large quantity reduces the mechanical properties of a sheet molding, the additional amounts of the fillers and the lubricants are less than two weight parts per hundred weight parts of the mixture of the polypropylene resin and the styrene series thermoplastic elastomer, and that of the resin fine powders are less than ten weight parts.

This resin fine powder is of an olefin series having an excellent compatibility with the powder resin composition. A particularly suited resin fine powder is a chemically pulverized low-density polyethylene. The term "chemically pulverized" means that the resin is dissolved in a solvent, and then placed into an insoluble solvent to deposit the resin. Thus, powders are obtained that are finer than those obtained through mechanical pulverization.

Figure 2:
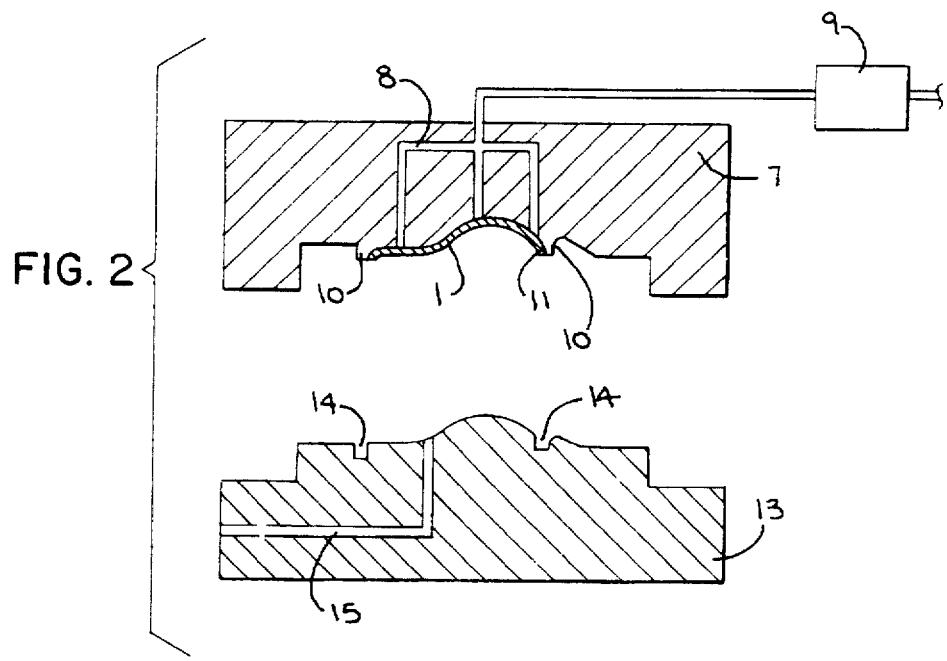
FIG. 2 is a cross-sectional view illustrating the skin material prior to attachment to a female mold.

The skin material 1 described above is integrally molded so as to adhere on a resinous core, as shown in FIG. 2 to FIG. 5. First, as shown in FIG. 2, the skin material 1 is attached to a female mold 7. In this case, a passage 8 passing through to a surface is provided in the female mold 7. An aspirator 9 used for evacuation causes the skin material 1 to be attached to the female mold 7. A projection 10 extending from the mold surface is provided on the female mold 7 and very close to an end 11 of the skin material 1. A male mold 13 having a concave recess 14 for accepting the projection 10 of the female mold 7 on the mold surface is provided with a passage 15 in the interior for injecting a molten resin. The temperatures of the female mold 7 and the male mold 13 prior to injection are 30° to 40° C.

Figure 3:
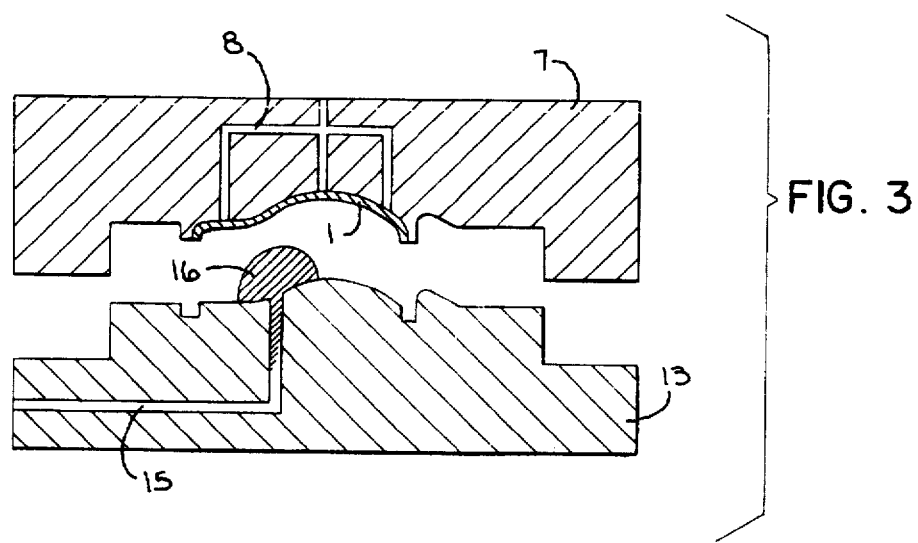
FIG. 3 is a cross-sectional view illustrating molten resin supplied from a passage within a male mold to a surface of the male mold while the female mold and the male mold are opened.

Subsequently, as shown in FIG. 3, a molten resin 16 having a relatively high viscosity is supplied through the passage 15 of the male mold 13 onto the mold surface of the male mold 13 while the female mold 7 and the male mold 13 are separated.

Figure 4:
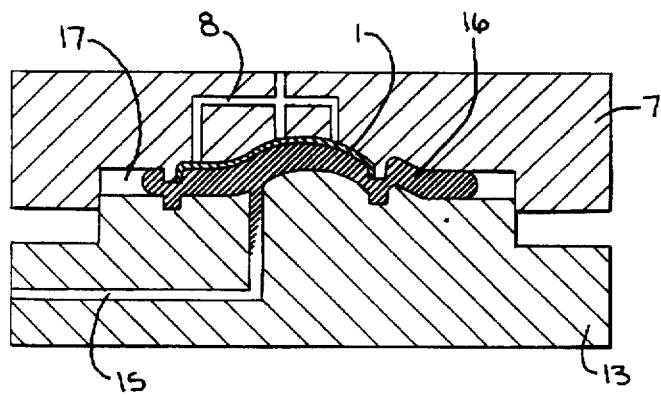
FIG. 4 is a cross-sectional view illustrating the molten resin introduced into a cavity by compressing the female mold and the male mold.
Figure 5:
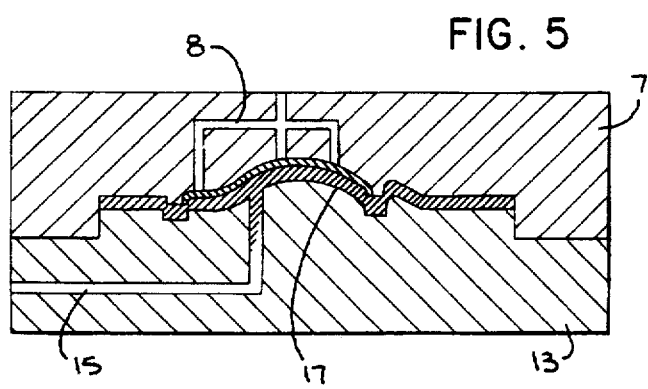
FIG. 5 is a cross-sectional view illustrating the female mold and the male mold brought together to pressurize the molding to give it a shape.
Figure 7:
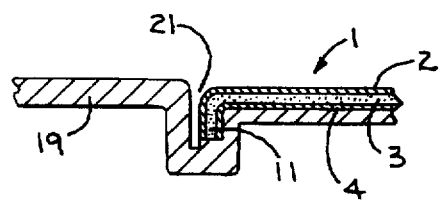
FIG. 7 is an enlarged drawing of part A in FIG. 6.

As shown in FIG. 4, the female mold 7 and the male mold 13 are then pressed together to introduce the molten resin 16 into a cavity 17. Further, as shown in FIG. 5, a clamping face pressure of 80 to 150 kg/cm$^2$ to shape the resin 16 is applied. In this case, the molten resin 16 is prevented from flowing into the space between the mold surface and the skin material 1 by the projection 10 provided in the female mold 7.

Figure 6:
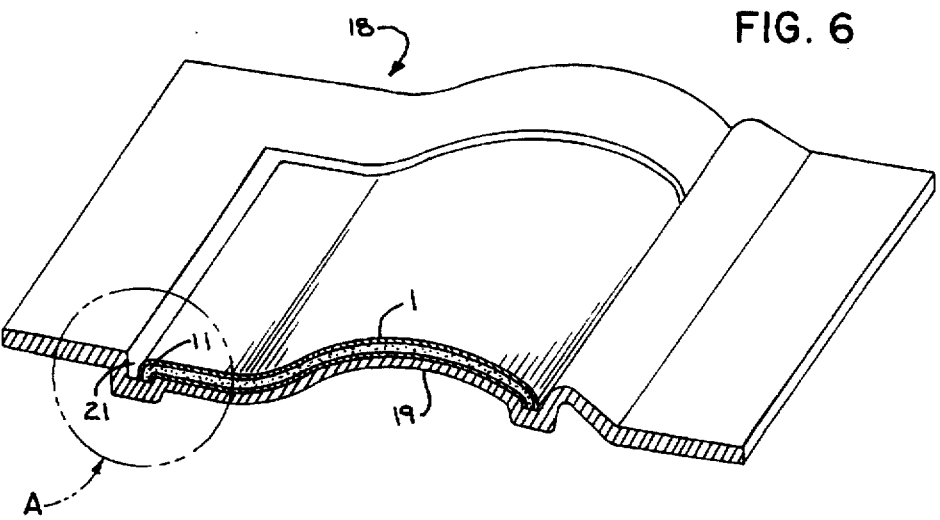
FIG. 6 is a fragmentary, perspective drawing of the resin molding produced.

Next, the female mold 7 and the male mold 13 are separated to remove a resin molding 18 out of the mold. The resin molding 18 thus obtained is a panel as shown in FIG. 6 having a structure in which the skin material 1 is adhered to a resinous core 19. The end 11 of the skin material 1 is accepted by a concave recess 21 of the cover 19 to exhibit a good appearance. The core 19 used here comprises polypropylene, ABS or polystyrene.

EXAMPLES

Next, the present invention will be explained in further detail with reference to concrete examples.

Example 1

Hypol J740 (polypropylene block copolymer manufactured by Mitsui Petrochemical Ind. Co., Ltd., MFR: 25 g/10 minutes) 50 weight parts as a polypropylene resin, Crayton G1657 (manufactured by Shell Chemical Co., Ltd., styrene content: 13 weight percent, MFR: 9 g/10 minutes) 50 weight parts as SEBS, Sumilizer GA80 (high molecular weight hindered phenol manufactured by Sumitomo Chemical Ind. Co., Ltd.) 0.1 weight part and Sumilizer TP-D (organic sulfur series secondary anti-oxidation agent manufactured by Sumitomo Chemical Ind. Co., Ltd.) 0.2 weight parts as heat stabilizers, and Sumisorb 300 (benzotriazole series manufactured by Sumitomo Chemical Ind. Co., Ltd.) 0.1 weight part as a UV absorber were mixed in a tumbler and extruded with a biaxial extruder (PCM45 manufactured by Ikegai Tekko Co., Ltd.) at 220° C. to make pellets.

Then, the pellets were dipped in liquid nitrogen and put into a turbo mill T250-4J (manufactured by Turbo Ind. Co., Ltd.) to pulverize them. Only substances passing through a sieve of 500 mm were collected. Zinc stearate (1.5 weight parts), a fluidity enhancer, was also added to the powder to obtain a powder resin composition with improved fluidity.

Next, the powder resin composition described above was used to carry out slush molding. An electroformed mold was first heated, and when the temperature of the mold reached 270° C., the above powder resin composition was put into the mold in one lot to cover the surface of the mold. Then, after leaving it standing for 10 seconds, the mold was reversed to discharge surplus powders. Subsequently, a mixture prepared by adding azodicarbonamide to the preceding powder resin composition was put into the electroformed mold. After leaving the mold standing for sixty seconds, the mold was reversed to discharge surplus powders, followed by curing for sixty seconds.

Next, the above powder resin composition was put into the same electroformed mold, and after leaving it standing for twenty seconds, the mold was reversed to discharge surplus powders. After curing for thirty seconds, the mold was rapidly cooled down to 60° C., and a skin material having three layers, namely a solid surface layer having a thickness of 0.4 mm, a foamed layer having a thickness of 1.5 mm, and a solid inner layer having a thickness of 0.6 mm were taken out of the mold.

After attaching the above skin material by evacuation to the female mold having a mold temperature of 30° C., a molten polypropylene resin (resin temperature: 190° C.) was supplied to the surface of the male mold while the female mold and the male mold were separated. Then, the female mold and the male mold were pressed together to introduce the molten resin into the cavity. Further, a clamping face pressure of about 80 kg/cm² was applied to shape the resin. Then, the female mold and the male mold were opened to remove the resin molding. The skin material and the core in the resin molding adhered well to one another, producing a skin material with a soft feeling and a sufficient drawn feeling.

As described above, in the resin molding and the production method for the same according to the present invention, a substance obtained by slush-molding a pulverized thermoplastic elastomer is used as a skin material, and integral molding by low-pressure injection molding causes the skin material to adhere firmly to the core material. In addition, a soft feeling and a drawn feeling which are characteristics of the skin material obtained by slush-molding can be sufficiently developed. Further, the low-pressure injection molding reduces the distortion of the core material after molding to produce an excellent result.

I claim:

1. A method for producing a resin molding, comprising the steps of:
   adhering a skin material to a first mold and supplying a molten resin between the first mold and a second mold which are separated;
   pressing the first mold and the second mold together to spread the molten resin into a cavity; and
   applying pressure to provide a form to thereby carry out integral molding with the skin material adhered to a resinous core,
   wherein said skin material is a styrene series thermoplastic elastomer selected from the group consisting of a styrene/ethylene-butylene/styrene block copolymer, a styrene/ethylene-propylene/styrene block copolymer and a hydrogenated styrene-butadiene rubber.

2. The method for producing a resin molding according to claim 1, wherein said first mold is a female mold and said second mold is a male mold.

3. The method for producing a resin molding according to claim 1, wherein the resinous core comprises a resin selected from the group consisting of polypropylene, ABS and polystyrene.

4. The method for producing a resin molding according to claim 1, wherein the skin material is obtained by slush-molding a pulverized mixture of a polypropylene resin and the styrene series thermoplastic elastomer.

5. The method for producing a resin molding according to claim 4, wherein the polypropylene resin/styrene series thermoplastic elastomer pulverized mixture has a weight ratio of from 30/70 to 70/30.

6. The method for producing a resin molding according to claim 1, wherein the skin material comprises two layers, including:
   a solid surface layer obtained by slush-molding a pulverized mixture of a polypropylene resin and the styrene series thermoplastic elastomer in a weight ratio of from 30/70 to 70/30; and
   a foamed layer obtained by slush-molding a substance prepared by adding a foaming agent to said pulverized mixture.

7. A method for producing a resin molding, comprising the steps of:
   adhering a skin material to a first mold and supplying a molten resin between the first mold and a second mold which are separated;
   pressing the first mold and the second mold together to spread the molten resin into a cavity; and
   applying pressure to provide a form to thereby carry out integral molding with the skin material adhered to a resinous core,
   wherein the skin material comprises three layers, including:
   a solid surface layer obtained by slush-molding a pulverized mixture of a polypropylene resin and a styrene series thermoplastic elastomer in a weight ratio of from 30/70 to 70/30;
   a foamed layer obtained by slush-molding a substance prepared by adding a foaming agent to said pulverized mixture; and
   a solid inner layer obtained by slush-molding the same material as that of said surface layer.

8. The method for producing a resin molding according to claim 7, wherein the melt flow rate of the polypropylene resin/styrene series thermoplastic elastomer is at least 8 g/10 minutes.

9. The method for producing a resin molding according to claim 7, wherein the solid surface layer has a thickness of from 0.2 to 1.0 mm, the foam layer has a thickness of from 1.0 to 2.0 mm, and the solid inner layer has a thickness of from 0.6 to 2.2 mm.

10. The method for producing a resin molding according to claim 7, wherein the foaming agent is selected from the group consisting of azodicarbonamide, dinitrosopentamethylenetetramine, 4,4'-oxybisbenzenesulfonylhydrazine, and hollow beads such a microballoons.

11. A method for producing a resin molding, comprising the steps of:
   providing a skin material by:
   preparing a metal mold for slush-molding by heating the metal mold to about 220°–270° C.;
   placing a first pulverized material made from a thermoplastic elastomer into the heated metal mold;
   allowing the first pulverized material to stand in the heated metal mold for a period of time;
   reversing the mold to discharge surplus powder;
   adding a second pulverized material containing a foaming agent into the heated metal mold with the first pulverized material, wherein the second pulverized material is made of the same material as that of the first pulverized material;

allowing the second pulverized material containing the foaming agent to stand in the heated metal mold for a period of time;

reversing the mold to discharge surplus powder;

curing the second pulverized material containing the filming agent and the first pulverized material;

adding a third pulverized material made from the same material as that of the first pulverized material into the metal mold with the second pulverized material containing the foaming agent and the first pulverized material;

allowing the third pulverized material to stand in the heated metal mold for a period of time;

reversing the mold to discharge surplus powder, whereby a layered product defining the skin material remains in the mold;

curing the layered product of the above steps;

cooling the metal mold down to 50°–70° C.; and removing the skin material from the mold;

adhering the skin material to a first mold and supplying a molten resin between the first mold and a second mold which are separated;

pressing the first mold and the second mold together to spread the molten resin into a cavity; and applying pressure to provide a form to thereby carry out integral molding with the skin material adhered to a resinous core.

12. The method for producing a resin molding according to claim 11, wherein the first through third pulverized materials comprise a pulverized mixture of a polypropylene resin and a styrene series thermoplastic elastomer combined in a weight ratio of from 30/70 to 70/30.

13. The method for producing a resin molding according to claim 12, wherein the melt flow rate of the polypropylene resin/styrene series thermoplastic elastomer is at least 8 g/10 minutes.

14. The method for producing a resin molding according to claim 11, wherein the first pulverized material defines a first layer having a thickness of from 0.2 to 1.0 mm, the second pulverized material containing a foaming agent defines a second layer having a thickness of from 1.0 to 2.0 mm, and the third pulverized material defines a third layer having a thickness of from 0.6 to 2.2 mm.

15. The method for producing a resin molding according to claim 12, wherein the styrene series thermoplastic elastomer is selected from the group consisting of a styrene•ethylene-butylene•styrene block copolymer, a styrene•ethylene-propylene•styrene block copolymer, and a hydrogenated styrene-butadiene rubber having a styrene content of 20 weight percent or less.

16. A method for preparing a skin material for a resin molding, comprising the steps of:

providing a skin material by:

preparing a metal mold for slush-molding by heating the metal mold to about 220°–270° C.;

placing a first pulverized material made from a thermoplastic elastomer into the heated metal mold;

allowing the first pulverized material to stand in the heated metal mold for a period of time;

reversing the mold to discharge surplus powder;

adding a second pulverized material containing a foaming agent into the heated metal mold with the first pulverized material, wherein the second pulverized material is made of the same material as that of the first pulverized material;

allowing the second pulverized material containing the foaming agent to stand in the heated metal mold for a period of time;

reversing the mold to discharge surplus powder;

curing the second pulverized material containing the filming agent and the first pulverized material;

adding a third pulverized material made from the same material as that of the first pulverized material into the metal mold with the second pulverized material containing the foaming agent and the first pulverized material;

allowing the third pulverized material to stand in the heated metal mold for a period of time;

reversing the mold to discharge surplus powder, whereby a layered product defining the skin material remains in the mold;

curing the layered product of the above steps;

cooling the metal mold down to 50°–70° C.; and removing the skin material from the mold.

17. The method for producing a skin material for a resin molding according to claim 16, wherein the foaming agent is selected from the group consisting of azodicarbonamide, dinitrosopentamethylenetetramine, 4,4'-oxybisbenzenesulfonylhydrazine, and hollow beads such a microballoons.

18. The method for producing a skin material for a resin molding according to claim 16, wherein the first through third materials comprise a pulverized mixture of a polypropylene resin and a styrene series thermoplastic elastomer combined in a weight ratio of from 30/70 to 70/30.

19. The method for producing a skin material for a resin molding according to claim 18, wherein the melt flow rate of the polypropylene resin/styrene series thermoplastic elastomer is at least 8 g/10 minutes.

20. The method for producing a skin material for a resin molding according to claim 16, wherein the first pulverized material defines a first layer having a thickness of from 0.2 to 1.0 mm, the second pulverized material containing a foaming agent defines a second layer having a thickness of from 1.0 to 2.0 mm, and the third pulverized material defines a third layer having a thickness of from 0.6 to 2.2 mm.

* * * * *